(12) United States Patent
Gebert et al.

(10) Patent No.: US 8,147,583 B2
(45) Date of Patent: Apr. 3, 2012

(54) MULTIPLE LAYER FILTER MEDIA

(75) Inventors: Richard Gebert, Elkton, MD (US); Wai Sing Poon, Hockessin, DE (US); Steve Stark, Wilmington, DE (US)

(73) Assignee: Gore Enterprise Holdings, Inc., Newark, DE (US)

( * ) Notice: Subject to any disclaimer, the term of this patent is extended or adjusted under 35 U.S.C. 154(b) by 940 days.

(21) Appl. No.: 11/760,433

(22) Filed: Jun. 8, 2007

(65) Prior Publication Data

US 2008/0302074 A1    Dec. 11, 2008

(51) Int. Cl.
*B01D 50/00* (2006.01)
(52) U.S. Cl. ............... 55/486; 55/497; 55/521; 55/522; 55/524
(58) Field of Classification Search .............. 55/486, 55/521, 524, 497, 500, 502, 522, 97, 302, 55/514; 428/198, 286, 315.5, 315.7, 315.9, 428/340
See application file for complete search history.

(56) References Cited

U.S. PATENT DOCUMENTS

| | | | |
|---|---|---|---|
| 3,953,566 A | 4/1976 | Gore | |
| 4,668,258 A | 5/1987 | Steer | |
| 4,878,930 A | 11/1989 | Manniso et al. | |
| 4,963,170 A | 10/1990 | Weber et al. | |
| 5,019,140 A | 5/1991 | Bowser et al. | |
| 5,096,473 A * | 3/1992 | Sassa et al. ............. | 95/282 |
| 5,108,474 A | 4/1992 | Riedy et al. | |
| 5,114,447 A | 5/1992 | Davis | |
| 5,158,586 A | 10/1992 | Layton | |
| 5,207,812 A | 5/1993 | Tronto et al. | |
| 5,238,477 A | 8/1993 | Layton | |
| 5,240,479 A | 8/1993 | Bachinski | |
| 5,401,448 A | 3/1995 | Ricciardi et al. | |
| 5,507,847 A * | 4/1996 | George et al. ............. | 55/486 |
| 5,522,908 A | 6/1996 | Frey | |
| 5,560,974 A * | 10/1996 | Langley ............. | 428/198 |
| 5,814,405 A | 9/1998 | Branca et al. | |
| 6,214,093 B1 | 4/2001 | Nabata et al. | |
| 6,334,881 B1 | 1/2002 | Giannetta et al. | |
| 6,409,785 B1 | 6/2002 | Smithies et al. | |
| 7,138,057 B2 | 11/2006 | Debes et al. | |
| 2003/0000389 A1 | 1/2003 | Schultheiss et al. | |
| 2003/0010210 A1 | 1/2003 | Kawano et al. | |
| 2003/0145566 A1 | 8/2003 | Parks et al. | |
| 2005/0148261 A1* | 7/2005 | Close et al. ............. | 442/381 |

FOREIGN PATENT DOCUMENTS

| | | |
|---|---|---|
| DE | 198 51 667 | 5/2000 |
| EP | 0 395 331 | 10/1990 |
| EP | 0 576 343 | 12/1993 |
| EP | 1 371 405 | 12/2003 |
| WO | WO 00/62900 | 10/2000 |

* cited by examiner

*Primary Examiner* — Jason M Greene
*Assistant Examiner* — Karla Hawkins
(74) *Attorney, Agent, or Firm* — Richard W. Ellis

(57) ABSTRACT

The invention provides a multiple layer filter media for removal of particles from a fluid stream. The multiple layer filter media may include a depth filtration layer, a membrane filtration layer and a support layer. Additional layers may be present. The membrane filtration layer may comprise expanded polytetrafluoroethylene (ePTFE). The various layers of the multiple layer filter media may be bonded together through a plurality of point bonds. The point bonding process may include simultaneously bonding multiple layers of the multiple layer filter media together in a single operation. The point bonds may be created using ultrasonic bonding.

46 Claims, 4 Drawing Sheets

MULTIPLE LAYER FILTER MEDIA

BACKGROUND

The removal of particulates from a gas stream has long been a practice in a variety of industrial fields. Conventional means for filtering particulates and the like from gas streams include, but are not limited to, filter bags, filter tubes, filter panels and filter cartridges. For convenience herein, the term "filter element" will be used to refer collectively to these types of filtration means.

Selection of the type of filtration media used is typically based on the fluid stream with which the filter element comes in contact, the operating conditions of the system and the type of particulates being filtered.

The flow of fluids, whether liquid or gas, produces a pressure differential, or pressure drop, across the element. Preferably, the pressure differential is as small as possible for a given fluid flow rate in order to minimize the power required to filter the fluid.

Filter media may be broadly characterized as either depth filtration media or surface filtration media. Particles tend to penetrate somewhat and accumulate within depth filtration media. In contrast, the majority of particles collect on the surface of surface filtration media.

Many materials are known to be useful as depth filtration media, including spunbond or meltblown webs, felts and fabrics made from a variety of materials, including polyesters, polypropylenes, aramids, cellulose, glasses and fluoropolymers. Known meltblown filter media demonstrate high efficiency and low pressure drop. Meltblown filter media also have high dust capacity. However, meltblown filter media suffer from relatively low water entry pressures, which may make them unsuitable for outdoor use in some environments.

Surface filters, such as membranes, have gained popularity in certain applications, particularly outdoor environments or those in which the fluid to be filtered contains liquid aerosols or harsh chemicals. In other applications, membrane filter media is useful because it has a more constant filtration efficiency than that of depth filtration media. Membranes have stable filtration efficiency because, unlike depth filtration media, a membrane filter's efficiency is not dependent upon the buildup of a cake of dust particles.

Polytetrafluoroethylene (PTFE) has demonstrated utility in many areas such as harsh chemical environments, which normally degrade many conventional metals and polymeric materials. A significant development in the area of particle filtration was achieved when expanded PTFE (ePTFE) membrane filtration media were incorporated as surface laminates on conventional filter elements. Examples of such filtration media are taught in U.S. Pat. Nos. 4,878,930, and 5,207,812, which are directed to filter cartridges for removing particles of dust from a stream of moving gas or air. Membranes constructed of ePTFE are advantageously hydrophobic.

In known filter systems where thermoplastic and ePTFE layers are bonded together to form filter elements, the bonded regions between separate layers may significantly restrict the fluid flow through the filter elements resulting in lower filter system performance. Such may be the case where conventional lamination techniques of bonding multiple layers by the application of heat and pressure across the entire surface of the filter element. In such filters, the uncontrolled intermingling of materials from the thermoplastic layer creates regions of restricted flow. Furthermore, the application of heat and pressure across the entire surface may cause stress and compression in large regions of the ePTFE layer, reducing filtration efficiency and lowering water entry pressure. In some outdoor environments, the loss of filtration efficiency and water entry pressure may lead to early failure of the filter element.

SUMMARY

In view of the foregoing, an object of embodiments described herein is to provide improved multiple layer filter media. Embodiments described herein provide for multiple layer filter media with high efficiency and air permeability. Embodiments described herein may accommodate bonding of multiple layers in a single-step bonding process resulting in reduced manufacturing cycle times, parts costs and production costs while maintaining or improving filter performance.

In one aspect, multiple layer filter media is provided. The multiple layer filter media may include a first material comprising a first thermoplastic, a second filter material and a third material comprising a second thermoplastic. The multiple layer filter media may contain a first region and at least one second region.

In an embodiment, within the first region, the multiple layer filter media may include a first layer, a second layer, and a third layer. In the first region, at least portions of the first material may be separately disposed in the first layer, at least portions of the second filter material may be separately disposed in the second layer, and at least portions of the third material may be separately disposed in the third layer. The layers may be arranged such that the second layer is disposed between the first and third layers.

In an arrangement, within the at least one second region, at least portions of the first material and the second filter material, and at least portions of the first material and the third material, may be directly bonded to define a continuous bond therebetween. The continuous bond may restrict any of the layers of the filter media from being removed without damaging any of the other layers of the filter media.

In an embodiment, the second layer may have an air permeability of at least 4 Frazier. Moreover, in certain embodiments the second layer may have an air permeability of at least 10 Frazier. In an arrangement, the second layer may have a water entry pressure of greater than 0.5 PSI. Furthermore, in certain arrangements the second layer may have a water entry pressure of greater than 1.5 PSI. In various embodiments, the second layer may include a microporous polymeric membrane. The microporous polymeric membrane may include ePTFE. In this regard, the second filter material may include ePTFE.

In an arrangement, the first material may be a filter material. At least portions of the first material may be disposed in a meltblown polymeric web. The meltblown polymeric web may, for example, include polypropylene, polyester, nylon, polyethylene, or a combination thereof. In a variation of the current arrangement, the third material may provide support for the filter media. At least portions of the third material may be disposed in fibers. The fibers may be spunbond fibers, hydroentangled fibers, wet laid fibers, or any combination thereof. The fibers may be cellulose fibers of a cellulose paper having a thermoplastic binder comprising at least portions of the second thermoplastic. The second thermoplastic may comprise polyester, nylon, polypropylene, polyethylene, polyurethane, phenolic, acrylic, polyvinyl acetate or a combination thereof. In a variation of the current arrangement, the second layer may include two ePTFE membranes. The two ePTFE membranes may have different attributes such as permeability and filtering capability. A permeable thermoplastic web may be disposed between the two ePTFE membranes.

The permeable thermoplastic web may be comprised of polypropylene, polyester, nylon, polyethylene, polyurethane or a combination thereof. In such a variation, the permeable thermoplastic web may comprise the second thermoplastic material. In another variation of the current arrangement, the first material may comprise a cellulose paper having a binder comprised of the first thermoplastic.

In still another arrangement, at least portions of the first material may be disposed in a permeable thermoplastic web. The permeable thermoplastic web may be comprised of polypropylene, polyester, nylon, polyethylene, polyurethane, or a combination thereof. In a variation of the current arrangement, the third material may provide support for the filter media similar to as described with respect to the previous arrangement.

In another embodiment, the multiple layer filter media comprising three layers may also comprise a fourth layer. The fourth layer may be disposed such that the third layer is between the second and fourth layers. The filter media may also comprise a fifth layer that may be disposed such that the fourth layer is between the third and fifth layers. The fourth layer may comprise a meltblown fibrous web. The fifth layer may comprise a spun bond thermoplastic fibrous web.

In various embodiments, the first, second and third layers may be free from being bonded to each other in the first region of the multiple layer filter media. In this regard, in the first region, the layers may be adjacent to each other and held in place by virtue of their interconnection in the at least one second region. The melting point of the first and third materials may be lower than a melting point of the second filter material. Moreover, the melting point of the first and third materials may be lower than a temperature at which the second filter material is significantly degraded.

In various embodiments, the ratio of the total area of the first region to the total area of all of the second regions may be at least 9 to 1. Moreover, in certain embodiments, the ratio of the total area of the first region to the total area of all of the second regions may be at least 32 to 1.

In various arrangements, the continuous bond may have a minimum thickness that is less than 50 percent of a maximum thickness of the filter media in the first region. Furthermore, in certain arrangements the continuous bond may have a minimum thickness that is less than 25 percent of a maximum thickness of the filter media in the first region.

In various embodiments, the continuous bond of the at least one second region may include at least portions of the first material, at least portions of the second filter material, and at least portions of the third material that are directly bonded.

In an arrangement, the filter media may have a specific quality factor of at least about 0.8 1/krayls at 0.1 μm DOP (dioctyl-phthalate) particle at 2.5 cm/s air velocity. In an arrangement, the filter media may have a dust holding capacity greater than about 10 g/m2.

In an embodiment, the filter media may be folded to form pleats. In such an embodiment, a maximum cross dimension of one of the at least one second regions may be less than twice a minimum thickness of the filter media in the first region.

The at least one second region may include a plurality of second regions. The plurality of second regions may be arranged in a pattern across the surface of the filter media. The pattern may be uniform. Each of the plurality of second regions may define a point bond. In various arrangements, the bonds may be ultrasonic bonds. Where the at least one second region is comprised of a plurality of point bonds, the ratio of the total area of the first region to the total area of all of the point bonds may be at least 9 to 1. In certain embodiments, the ratio may be at least 32 to 1.

In another aspect, a method of making a filter media is provided. The method may include positioning first, second, and third layers and applying energy to at least one selected region of the lateral extent of the positioned layers. The positioning may include arranging the first, second, and third layers such that they are separately disposed in adjacent face-to-face relation across the lateral extent with the second layer disposed between the first and third layers. The first layer may comprise a first thermoplastic material, the second layer may comprise a second filter material, and the third layer may comprise a third thermoplastic material. The applying of energy may cause portions of the first thermoplastic material to be bonded with portions of the third thermoplastic material within the at least one selected region of the lateral extent thereby defining a continuous bond therebetween.

In an embodiment of the current method, the applying step may include applying energy to a plurality of the selected regions. Each of the plurality of the selected regions may define a point bond. The ratio of the area of the filter media outside of the point bonds to the total area of all of the point bonds may be at least 9 to 1. In certain embodiments, the ratio may be at least 32 to 1.

In an embodiment, the applying step may include applying energy to heat the positioned first, second, and third layers to a temperature that is above a melting points of the first and third layers, and below the melting point of the second layer. In various embodiments, the applied energy may include ultrasonic energy.

The applying step may include flowing at least a portion of the first thermoplastic material though the second layer and into the third layer within the selected region of the lateral extent. In an embodiment, the first, second, and third layers may be free from bonding to each other outside of the selected region of the lateral extent after the applying step. Furthermore, after the applying step, the filter media may have an air permeability of at least 4 Frazier. In certain embodiments, the air permeability may be at least 10 Frazier. After the applying step, the filter media may have a water entry pressure of greater than 0.5 PSI. In certain embodiments, the water entry pressure may be greater than 1.5 PSI.

The various features, arrangements and embodiments discussed above in relation to each aforementioned aspect may be utilized by any of the aforementioned aspects. Additional aspects and corresponding advantages will be apparent to those skilled in the art upon consideration of the further description that follows.

DETAILED DESCRIPTION

Figure 1:
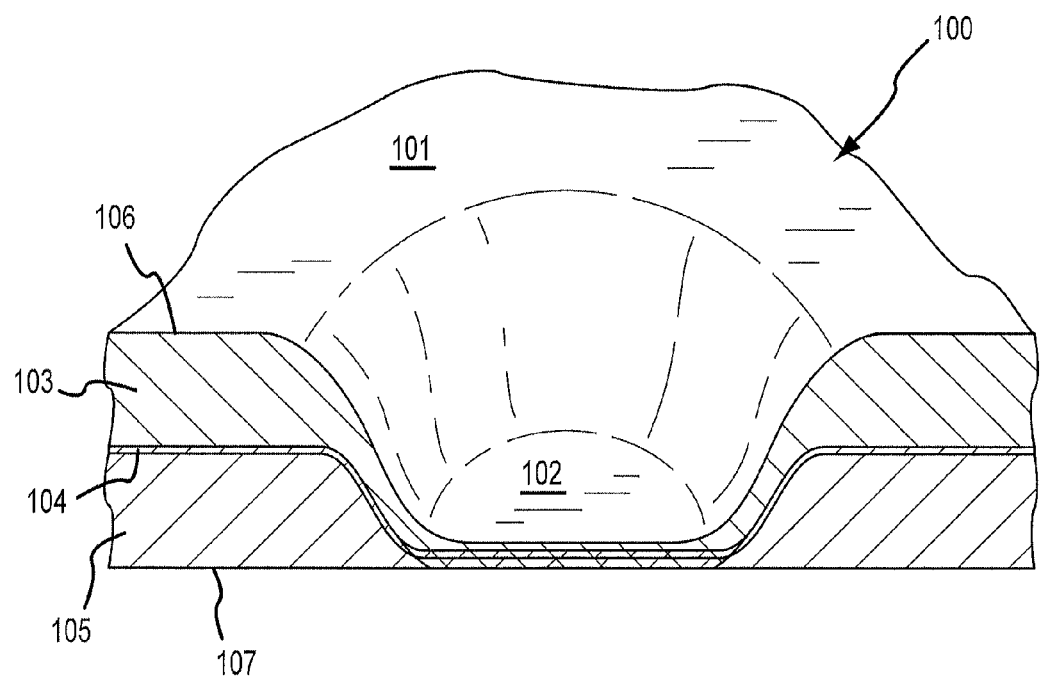
FIG. 1 is a cross sectional isometric schematic diagram of an embodiment of a filter media in the area of a point bond.

FIG. 1 is a cross sectional schematic diagram of an embodiment of a multiple layer filter media 100. The illustration of FIG. 1 includes a first region 101 in which the multiple layers of the multiple layer filter media 100 are disposed adjacent to each other. The illustration also includes a second region 102 in which the multiple layers of the multiple layer filter media 100 are bonded together. Each of these regions 101, 102 is described further below. The relative thicknesses of the layers illustrated in FIG. 1 are for illustration purposes and are not necessarily drawn to scale.

The multiple layer filter media 100 illustrated in FIG. 1 includes two filtration layers: a depth filtration layer 103 and a membrane filtration layer 104. The direction of fluid flow through the multiple layer filter media 100 may be from a first side 106 to a second side 107 of the multiple layer filter media 100. As illustrated in FIG. 1, the depth filtration layer 103 may be positioned upstream of the membrane filtration layer 104. The multiple layer filter media 100 may further include a support layer 105. The support layer 105 may be positioned either upstream or downstream of the membrane filtration layer 104 relative to fluid flow through the multiple layer filter media 100. In the illustration of FIG. 1, the support layer 105 is shown positioned downstream of the membrane filtration layer 104.

Within the first region 101, the layers 103, 104, 105 of the multiple layer filter media 100 may be disposed adjacent to each other. Moreover, in the first region the layers may not be bonded to each other. For example, in the first region 101, layers 103, 104, 105 may be held adjacent to each other by virtue of their connection to the second region 102 where the layers 103, 104, 105 may be bonded together. As such, the performance characteristics of the multiple layer filter media 100 may exceed those of known filter systems. For example, multiple layer filter media 100 with discrete bonded regions such as second region 102 may achieve double the fluid flow as compared to filter media using the same layers but utilizing known interconnection methods (e.g., bonding across the entire area of the various layers).

The depth filtration layer 103 may function as a pre-filter layer. The depth filtration layer 103 may be comprised of a material that includes thermoplastic. The depth filtration layer 103 may comprise a meltblown polymeric web. Meltblown webs are produced by entraining melt spun fibers with convergent streams of heated air to produce extremely fine filaments. Meltblown processing forms continuous sub-denier fibers, with relatively small diameter fibers that are typically less than 10 microns.

The meltblown polymeric web of the depth filtration layer 103 may be made from a variety of polymeric materials, including polypropylene, polyester, polyamide, polyvinyl chloride, polymethylmethacrylate, nylon, and polyethylene. Polypropylene is among the more preferred polymeric materials.

Optionally, the depth filtration layer 103 may include at least one electret filter media layer comprising a highly efficient layer having an electrostatic charge. Electric charge can be imparted to meltblown fibrous webs to improve their filtration performance using a variety of known techniques. Optionally, the depth filtration layer 103 may include a scrim for the protection of the fine fibers of the depth filtration layer 103 from abrasion during processing. The scrim may, for example, be comprised of polypropylene, nylon and/or polyester.

The membrane filtration layer 104 may be comprised of a microporous polymeric membrane. The microporous polymeric membrane may capture particles that pass through the depth filtration layer 103. Microporous polymeric membranes have demonstrated dependability and reliability in removing particles and organisms from fluid streams. Membranes may be characterized by their polymeric composition, air permeability, water intrusion pressure and filtration efficiencies. A preferred membrane filtration layer 104 has an average air permeability of at least 4 Frazier. A more preferred membrane filtration layer 104 has an average air permeability of at least 10 Frazier.

A variety of microporous polymeric membranes can be used as the membrane filtration layer 104, depending on the requirements of the application. The membrane filtration layer 104 may be constructed from one or more of the following exemplary materials: nitrocellulose, triacetyl cellulose, polyamide, polycarbonate, polyethylene, polypropylene, polysulfone, polytetrafluoroethylene, polyvinyl chloride, polyvinylidene fluoride, acrylate copolymer.

The membrane filtration layer 104 is preferably constructed from a hydrophobic material that is capable of preventing the passage of liquid water. In addition, the membrane filtration layer 104 may remain intact through the bonding process and thereby retain its ability to prevent the passage of liquid water therethrough. Accordingly, the membrane filtration layer 104 in the multiple layer filter media 100 may be able to withstand applied differential pressure across the multiple layer filter media 100 without any liquid passing through it. A preferred multiple layer filter media 100 has a water entry pressure of greater than about 0.5 PSI. A more preferred multiple layer filter media 100 has a water entry pressure of greater than about 1.5 PSI.

Preferably, the membrane filtration layer 104 comprises a microporous fluoropolymer, such as ePTFE, fluorinated ethylenepropylene (FEP), perfluoronalkoxy polymer (PFA), polypropylene (PU), polyethylene (PE) or ultra high molecular weight polyethylene (uhmwPE). Most preferably, the membrane filtration layer 104 comprises ePTFE. Suitable ePTFE membranes are described in U.S. Pat. No. 5,814,405. The membranes described therein have good filtration efficiency, high air flow, and high burst strength. Methods of making suitable ePTFE membranes are fully described therein. However, ePTFE membranes constructed by other means can also be used. Suitable ePTFE membranes are available from W. L. Gore & Associates, Inc. of Newark, Del. The membrane filtration layer 104 may optionally contain a filler material to improve certain properties of the filter.

The support layer 105 may be provided to, inter alia, maintain the filtration layers in the proper orientation to fluid flow. Supporting material may be rigid enough to support the membrane filtration layer 104 and depth filtration layer 103, but soft and supple enough to avoid damaging the membrane filtration layer 104. The support layer 105 may comprise fibrous material. The fibrous material may include thermoplastic material. The support layer 105 may, for example, comprise spunbond thermoplastic fibers, hydroentangled thermoplastic fibers, wet laid thermoplastic fibers or any combination thereof. The fibers may, for example, comprise polyester, nylon, polypropylene, polyethylene, or any combination thereof. In a pleated orientation, the support layer 105 may provide airflow channels in the pleats while holding the pleats apart (e.g., preventing the pleats from collapsing). The support layer 105 may be positioned downstream (e.g., as shown in FIG. 1) or upstream of the membrane filtration layer 104.

The support layer 105 may include a cellulose paper having a binding material such as described in U.S. Pat. No. 7,138, 057. The ratio of the weight of the cellulose paper to the weight of the binding material may, for example, be between 4 to 1 and 1.5 to 1. The binding material may be thermoplastic.

As noted, the multiple layers of the multiple layer filter media 100 are bonded together in the second region 102. The multiple layer filter media 100 may include a plurality of second regions 102. Each of the plurality of second regions 102 may be a point bond. Each of the plurality of second regions 102 may be localized regions where the multiple layers of the multiple layer filter media 100 are bonded together. The plurality of second regions 102 may be situated throughout the multiple layer filter media 100 to hold the multiple layers of the multiple layer filter media 100 together during the life cycle of the multiple layer filter media 100. This life cycle may, for example, include manufacturing processes (e.g., pleating processes), shipping, installation, filtering, and cleaning. In an embodiment, the plurality of second regions 102 may each have a maximum cross dimension that is less than twice a minimum thickness of the multiple layer filter media 100 in the first region 101. This may be advantageous in that the any one of the plurality of second regions 102 that may be positioned in the bended area of a pleated multiple layer filter media 100 may be small enough that damaging stress is not introduced to the multiple layer filter media 100 in the area of the second region 102. For certain applications, the plurality of second regions 102 may each have a maximum cross dimension of less than 5 millimeters.

The exemplary second region 102 shown in cross-section in FIG. 1 is generally round in shape as observed from a viewpoint perpendicular to the multiple layer filter media 100. Although other point bond shapes may be used, a circular point bond may be beneficial since it has no corners that could act as stress concentrators.

Within the second region 102, material from one or more of the layers of the multiple layer filter media 100 may be colocated with material from one or more of the other layers of the multiple layer filter media 100. This may be achieved by causing material from one or more of the layers to flow into material from one or more of the other layers during the bonding process used to form the second region 102. The flowing of material from the layers during the bonding process may be controlled through, for example, material selection for the layers and control of the application of energy during the bonding process.

FIG. 1 illustrates an exemplary embodiment wherein, in the second region 102, material from the depth filtration layer 103 has been caused to flow into the membrane filtration layer 104 and the support layer 105. The bonding process to form such a configuration may have proceeded as follows. First, energy (e.g., ultrasonic, heat and/or pressure) is applied to the multiple layer filter media 100 in the area of the second region 102 to be created. This application of energy causes the depth filtration layer 103 to melt and become densified. Material from the melted depth filtration layer 103 also flows into both the membrane filtration layer 104 and the support layer 105. Also during the bonding process, material from the support layer 105 may melt and become densified and material from the support layer 105 may flow into other layers of the multiple layer filter media 100, such as the membrane filtration layer 104. After the removal of the energy source and the cooling of the second region 102, the material that had softened, melted and/or flowed may solidify. In this regard, the materials that have flowed together may have become fused together.

Where the support layer 105 is comprised of a cellulose paper with a thermoplastic binder, portions of the thermoplastic binder may flow into the membrane filtration layer 104 during the bonding process. Moreover, in an arrangement, the depth filtration layer 103 may include a cellulose paper with a thermoplastic binder.

After formation, the second region 102 may include a relatively thin layer of densified material from the depth filtration layer 103 along the first side 106 of the multiple layer filter media 100. Adjacent to and interconnected with the layer of densified material from the depth filtration layer 103, may be the membrane filtration layer 104 with material from the depth filtration layer 103 occupying the porosity of the membrane filtration layer 104. Some material from the support layer 105 may also occupy a portion of the porosity of the membrane filtration layer 104. Disposed along the second side 107 and adjacent to the membrane filtration layer 104 may be a densified support layer 105 intermixed with material from the depth filtration layer 103 that was melted and flowed into the support layer 105 during the bonding process. Thus a continuous bond including material from the first layer directly bonded to the second layer and material from the first layer directly bonded to material from the third layer may be formed in second region 102. In this manner, after bonding, the second region 102 may be configured such that it contains an unbroken band of either a densified or intermixed material between the first side 106 and the second side 107 of the multiple layer filter media 100.

The second region 102 of FIG. 1, as described above, includes flowing of the depth filtration layer 103 into both the membrane filtration layer 104 and the support layer 105. In an alternate embodiment, the depth filtration layer 103 may, for example, only flow into the membrane filtration 104. In such an embodiment, a portion of the support layer 105 may flow into the membrane filtration layer 104 during the bonding process. In this regard, this alternate embodiment may include collocating material from the depth filtration layer 103 and material from the support layer 105 within the membrane filtration layer 104.

It will be appreciated that by selecting materials for the various layers of the multiple layer filter media 100 with specific melting temperatures and flow characteristics, various configurations of intermixed layers may be achieved. For example, by selecting materials for the depth filtration layer 103 and the support layer 105 with lower melting temperatures than the membrane filtration layer 104, the configuration of FIG. 1 may be achieved where the depth filtration layer 103 has flowed into the membrane filtration layer 104 and the support layer 105 during the bonding process. In another example, by selecting a material for the support layer 105 with a lower melting temperature than the depth filtration layer 103 or membrane filtration layer 104, a configuration may be achieved where the support layer 105 material is flowed into the depth filtration layer 103 and membrane filtration layer 104 during the point bonding process.

The bond strength of the second region 102 may exceed the shear strength of one or more of the layers surrounding the second region 102. For example, in arrangements where the depth filtration layer 103 is comprised of a meltblown web, the bond strength in the second region between the various layers may be greater than the shear strength of the meltblown web. Accordingly, when a force is applied to pull the layers apart, the meltblown web may tear outside of the second region 102 prior to any failure within the second region 102, thus leaving the second region 102 intact.

The plurality of second regions 102 may be operable to restrict removal of one of the layers of the multiple layer filter media 100. For example, removal of one of the layers (e.g., the depth filtration layer 103 or the support layer 105) may damage the remaining layers of multiple layer filter media 100 in such a way that it is obvious to a user that the multiple layer filter media 100 is no longer capable of functioning as intended.

As noted, the second region 102 may become densified and the porosity of the membrane filtration layer 104 may become at least partially filled with material from the depth filtration layer 103. As a result, in the second region 102, the ability of the multiple layer filter media 100 to allow fluid flow therethrough may be significantly reduced or eliminated. Accordingly, the overall bond strength between the various layers of the multiple layer filter media 100 may be balanced against the loss of fluid flow capability through the multiple layer filter media 100 due to the total area of the plurality of second regions 102. For example, as the total number and area of the second regions 102 is increased, the mechanical interconnection between the various layers is strengthened. However, at the same time the fluid flow capability of the multiple layer filter media 100 is reduced. Accordingly, it may be preferable to have the total area of the plurality of second regions 102 cover less than 10% of the total surface area of the multiple layer filter media 100 (e.g., the ratio of the area of the first region 101 to the total area of all of the second regions 102 may be greater than nine to one). More preferably, the total area of the plurality of second regions 102 may cover less than 3% of the total surface area of the multiple layer filter media 100 (e.g., the ratio of the area of the first region 101 to the total area of all of the second regions 102 may be greater than about thirty-two to one).

The second region 102 illustrated in FIG. 1 shows the materials of the multiple layer filter media 100 compressed toward the second side 107. Other configurations, such as the multiple layer filter media 100 compressed toward the first side 106 may also be utilized. The total amount of compression of the multiple layer filter media 100 within the second region 102 may be such that the minimum thickness of the continuous bond formed in the second region 102 is less than half of the maximum thickness of the multiple layer filter media 100 in the first region 101. In certain arrangements, the minimum thickness of the continuous bond in the second region 102 may be less than one quarter of the maximum thickness of the multiple layer filter media 100 in the first region 101.

As noted, the application of energy to the second region 102 may be used to melt and/or cause material from one or more of the layers of the multiple layer filter media 100 to flow into and be fused with material from one or more other layers of the multiple layer filter media 100. In this regard, to bond the layers of the multiple layer filter media 100 together, it may not be necessary to introduce additional materials, such as adhesives, in order to have the various layers bond together. Furthermore, the amount of energy applied to the second region 102 may be selected so that the structure of the membrane filtration layer 104 is not degraded during the energy application process. For example, the amount of energy applied to the second region 102 may cause material from the depth filtration layer 103 to flow into and bond within the membrane filtration layer 104, and also cause material from the depth filtration layer 103 to melt and flow into and bond within the support layer 105. In this regard, the membrane may retain its porous structure, which in the second region 102 may serve as a matrix for thermoplastic from the depth filtration layer 103 and/or the support layer 105. As may be appreciated, the application of energy applied to cause the above described flowing of materials may be continuously applied in a single process step resulting in the formation of a continuous bond.

Ultrasonic bonding equipment may be used to apply the localized energy to create the second region 102. Using ultrasonic energy to create the second region 102 may have several beneficial characteristics. For example, ultrasonic bonding equipment may allow for precise control of the amount of energy delivered to each second region 102. In this regard, the energy delivered may be selected to melt only one or two of the layers of the multiple layer filter media 100. The size and shape of the second region 102 may be determined by the size and shape of the anvil used in the ultrasonic bonding equipment along with the amount of power delivered during the bonding process.

Another benefit of using ultrasound may be that all the layers may be bonded together in a single application of ultrasonic energy. For example the multiple layer filter media 100, arranged with the with the depth filtration layer 103 on one side of the membrane filtration layer 104, and the support layer 105 on the other side of the membrane filtration layer 104, may be bonded together in a single-step application of ultrasonic energy. Additionally, multiple individual second regions 102 may be simultaneously created. Alternatively, a subset of layers of the multiple layer filter media 100 may be bonded together and then additional layers may be bonded to the subset of layers, thereby completing the bonding in two or more discrete bonding steps.

Figure 2:
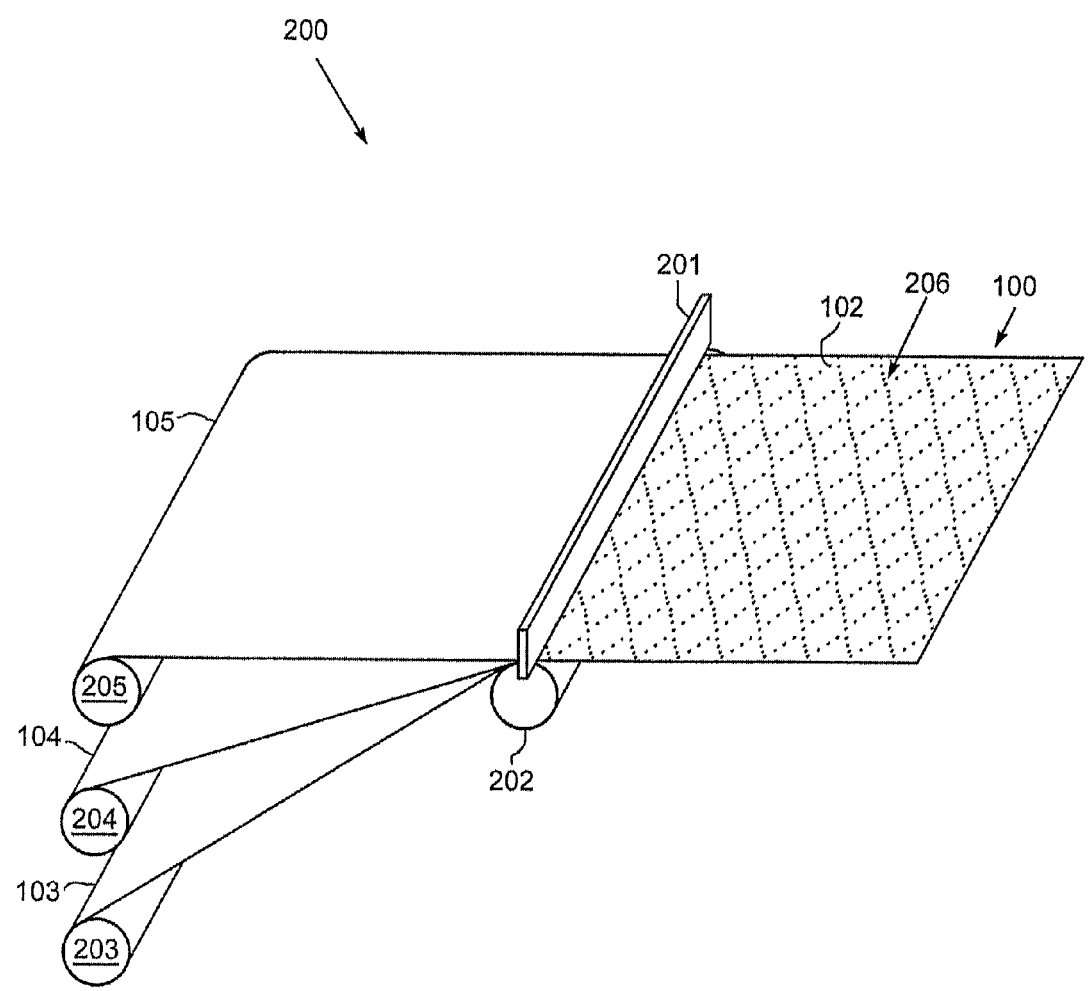
FIG. 2 is a schematic diagram of an exemplary ultrasonic bonding apparatus bonding multiple layers of materials.

FIG. 2 is a schematic diagram of an exemplary ultrasonic bonding apparatus 200 bonding multiple layers of materials. The ultrasonic bonding apparatus 200 may include an ultrasound horn 201 and an anvil 202. The design and operation of ultrasonic bonding equipment such as the ultrasonic bonding apparatus 200 are known.

To bond multiple layers of the multiple layer filter media 100, individual sheets of materials may simultaneously be fed into the ultrasonic bonding apparatus 200. For example, a roll 203 of depth filtration layer 103 material, a roll 204 of membrane filtration layer 104 material, and a roll 205 of support layer 105 material may be simultaneously be fed between the horn 201 and anvil 202 where the three layers will be bonded together in a single step application of ultrasonic energy.

The horn 201 and anvil 202 may be configured to produce any appropriately configured second region 102 or plurality of second regions 102. For example, a plurality of second regions 102 may be produced in a diamond pattern 206 by placing a corresponding pattern on the anvil 202.

Other methods of creating point bonds may be utilized. For example, heated elements may be used to transfer heat to the multiple layer filter media 100 in the area of the second regions 102 to be created. Generally, this may require direct contact between the heated element and the multiple layer filter media 100. Other methods of transferring energy to specific points (e.g., infrared) may also be used to create the second regions 102.

The thicknesses of the various layers of the multiple layer filter media 100 may be varied to achieve various performance characteristics of the multiple layer filter media 100. The permeability of each of the layers may also be varied to achieve various performance characteristics.

Additional configurations of multiple layer filter media may also be created using the principles and methods described herein. For example, an additional membrane filtration layer may be added to the embodiment illustrated in FIG. 3 between the existing membrane filtration layer 104 and the support layer 105. The presence of two membrane filtration layers may be advantageous in that, for example, the first membrane filtration layer may have a first particle efficiency and the second membrane filtration layer may have a second particle efficiency. In such a configuration, the first membrane filtration layer may act as a pre-filter for the second membrane filtration layer, thereby improving overall multiple layer filter media performance. A permeable thermoplastic web layer may be placed between the two membrane filtration layers. The permeable thermoplastic web layer may have a permeability that does not significantly affect the overall filtration performance of the multiple layer filter media in the first region. In the second region, the permeable thermoplastic web layer may melt and flow into both of the two membrane filtration layers, thereby bonding the layers together. In this regard, material from the permeable thermoplastic web layer may be directly bonded to material from the depth filtration layer 103 and/or the support layer 105. The permeable thermoplastic web layer may, for example, be comprised of polyester, nylon, polypropylene, polyethylene, polyurethane, or a combination thereof. The permeable thermoplastic web layer may comprise a meltblown web.

Other arrangements may include additional layers. For example, an arrangement may include a fourth layer that includes a meltblown fibrous web and a fifth layer that includes a spunbond thermoplastic fibrous web. The layers in such an arrangement may be ordered such that the third layer is between the second and fourth layers and the fourth layer is between the third and fifth layers. The meltblown fibrous web of the fourth layer may provide additional filtering capability and the spunbond thermoplastic fibrous web of the fifth layer may provide additional support.

The air permeability values noted herein may be determined according to a Frazier number test method. In this method, air permeability is measured by clamping a test sample in a gasketed-flanged fixture, which provides a circular section of approximately 2.75 inches in diameter and 6 square inches in area, for air flow measurement. The upstream side of the sample fixture is connected to a flow meter in line with a source of dry compressed air. The downstream side of the sample fixture is open to the atmosphere. Testing is accomplished by applying an air pressure of 0.5 inches of water to the upstream side of the sample and recording the flow rate of the air passing through the in-line flowmeter (a ball-float rotameter). Results are reported in terms of Frazier number, which has units of cubic feet/minute/square foot of sample at 0.5 inches of water pressure.

Figure 3:
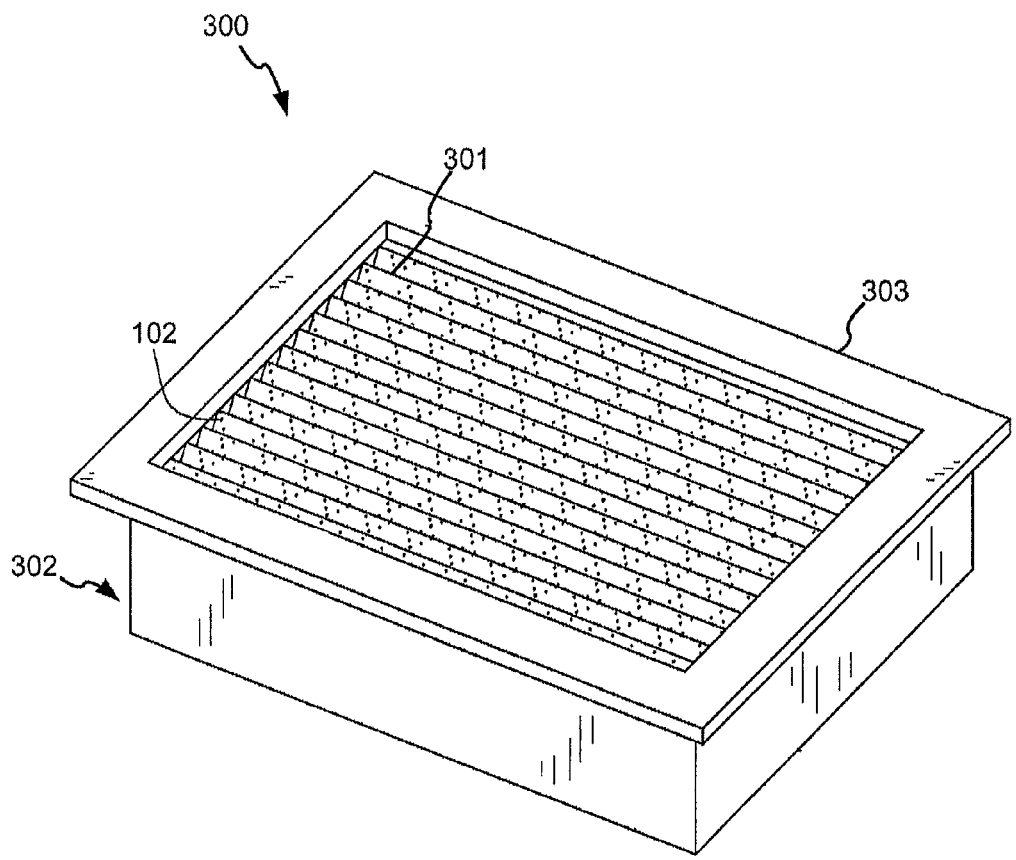
FIG. 3 is an isometric view of an exemplary filter assembly.

FIG. 3 is an isometric view of an exemplary filter assembly 300. The filter assembly 300 comprises a bonded and pleated multiple layer filter media 301. The bonded and pleated multiple layer filter media 301 may be surrounded along its edges by a filter peripheral member 302. A gasket 303 may be interconnected to the filter peripheral member 302. The bonded and pleated multiple layer filter media 301 may be comprised of multiple layer filter media such as described herein. The bonded and pleated multiple layer filter media 301 includes a plurality of second regions 102 in the diamond pattern 206 of FIG. 2. As noted above, each of the plurality of second regions may have a maximum cross dimension small enough that the locations of the plurality of second regions may not need to be accounted for when forming the pleats. Alternatively, the plurality of second regions may be dispersed in a pattern that leaves bond free areas where pleats may be placed. In this manner, the pleat tips could be free of the plurality of second regions.

By sealing the bonded and pleated multiple layer filter media 301 to the filter peripheral member 302, the flow of fluid may be restricted to passing through the bonded and pleated multiple layer filter media 301. In this regard, the filtering performance of the filter assembly 300 may correspond to the filtering performance of the bonded and pleated multiple layer filter media 301. Accordingly, a preferred filter assembly 300 may have a water entry pressure of at least about 0.5 PSI. More preferably, a preferred filter assembly 300 may have a water entry pressure of at least about 1.5 PSI.

Moreover, the filter assembly 300 may have a specific quality of at least about 0.8 1/krayls at 0.1 μm DOP particle at 2.5 cm/s air velocity. The specific quality is a useful metric to compare the filtration performance of filter media. It is the ratio of the penetration to the airflow resistance and the value is expressed in 1/kilorayls. The higher the ratio, the higher the particle collection efficiency relative to its airflow resistance. The airflow resistance is the ratio of the pressure drop across the filter to the face velocity. The specific quality is defined as:

$$\text{Specific quality} = -\log(\text{penetration})/(\text{filter pressure drop/face velocity}) \times \tfrac{1}{1000}$$

where penetration is the particle penetration of the filter, filter pressure drop is in Pa, and face velocity is in m/s. Specific quality is dependent on the particle size and face velocity.

Penetration is measured by an automated efficiency tester (e.g., Model 8160, from TSI Inc., Shoreview, Minn.). The test is performed at ambient room temperature (70° F.) and relative humidity conditions (40%). A DOP solution is atomized to generate an aerosol containing particles from 0.03 to 0.3 microns in diameter. The filter sample is challenged with the aerosol at air flow velocity of between 1 and 5.3 cm/s, Two condensation nucleus particle counters measure the particle concentrations upstream and downstream of the test sample simultaneously. The penetration is reported as the percentage of upstream challenge particles collected by the filter.

Additionally, a preferred filter media 301 of assembly 300 may have a dust loading capacity greater than about 10 g/m$^2$. Dust loading capacity may be determined according to the following method. A 5% aqueous sodium chloride solution is atomized using a constant output atomizer (Model 3096, from TSI Inc.). The particles are dried by heating to 80° C. and then diluted with clean, dry air. The filter test sample, 44.4 mm in diameter, is weighed prior to testing and is placed inside a filter holder. The face velocity is set to 53 mm/s. The pressure drop across the filter is monitored continuously by a pressure transducer. The filter is loaded with the sodium chloride aerosol until the final pressure drop across the filter media reaches 750 Pa. The test sample is weighed again after the test to determine the mass loading. The dust loading capacity is defines as:

$$\text{Dust Loading Capacity} = (\text{Final Weight} - \text{Initial Weight})/\text{Filter Area}$$

where the weights are in grams and the filter area is in square meters. Accordingly, dust loading capacity is expressed in g/m2.

FIG. 3 illustrates an embodiment of a filter assembly 300 where the filter assembly is generally rectangular and the filter media 301 is pleated. The multiple layer filter media described herein may be incorporated into other configurations and products. For example, the multiple layer filter media described herein may be used in circular or cylindrical filters. For example, the multiple layer filter media described herein may be used in non-pleated configurations.

Figure 4:
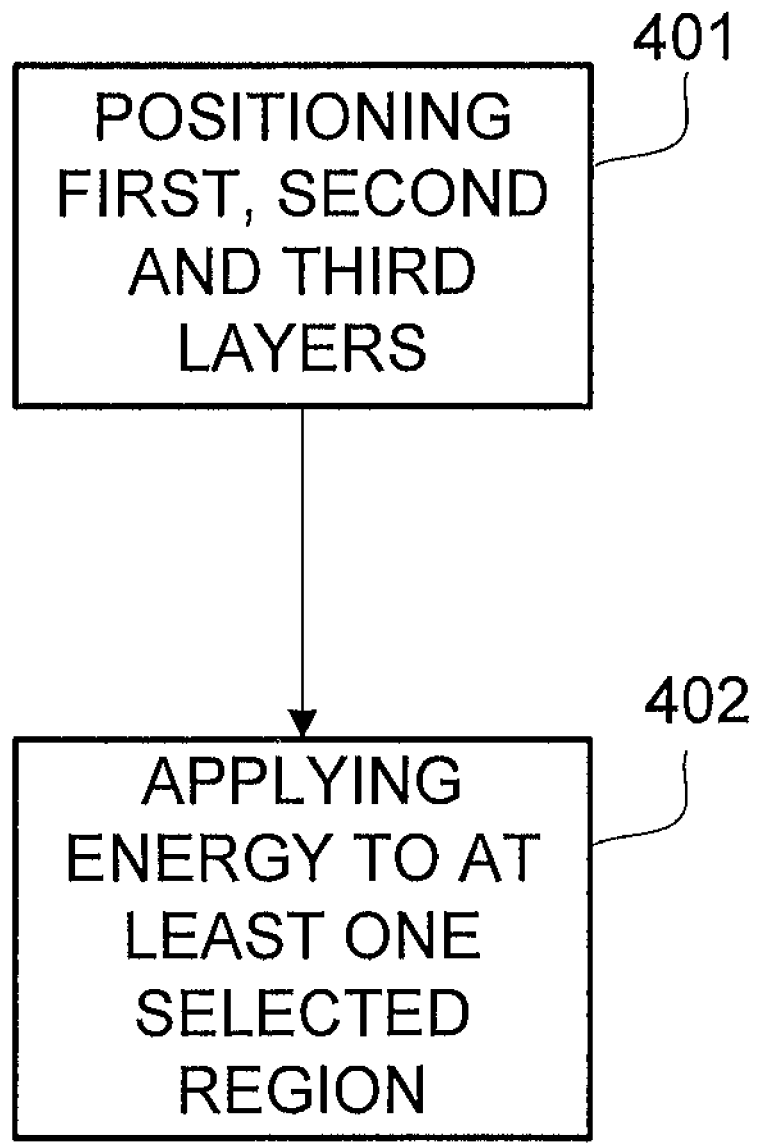
FIG. 4 is a flowchart of an embodiment of a method of manufacturing a filter media.

FIG. 4 is a flowchart of a method of making a filter media. The first step 401 in the method may be to position first, second and third layers. The positioning may include disposing the second layer between the first and third layers such that the first and second layers are in an adjacent face-to-face relationship and the second and third layers are in an adjacent face-to-face relationship across a lateral extent. This step may be accomplished by unrolling the first, second and third layers from rolls. The first layer may comprise a first thermoplastic material, the second layer may comprise a second filter material, and the third layer may comprise a third thermoplastic material.

The next step 402 may be to apply energy to at least one selected region of the lateral extent. The applying of energy may cause portions of the first thermoplastic material to be bonded with portions of the third thermoplastic material within the at least one selected region thereby defining a continuous bond therebetween.

The at least one selected region may include a plurality of selected regions that may be spaced across the lateral extent. Each of these selected regions may define a point bond. Within the at least one selected region, the applying of energy may cause at least a portion of the first material to flow through the second layer and into the third layer.

The applying of energy may cause the layers to be heated in the selected at least one 20 region to a temperature that is above a melting point of the first and third layers, and below a melting point of the second layer. The applying of energy may include applying ultrasonic energy to the layers. After the applying energy step is complete, the first, second, and third layers may be free from bonding with each other outside of the at least one selected region.

EXAMPLE

Three layers of material were simultaneously bonded together using ultrasonic bonding. The first layer, a meltblown media consisting of 30 grams per square meter (g/m2) polypropylene fine fibers with a 15 g/m2 polypropylene scrim was ultrasonically bonded together with a second material, an ePTFE membrane, and a third material, a spunbond polyester substrate with basis weight of 150 g/m2. The scrim for the meltblown was for the protection of the fine fibers from abrasion during processing. The fiber size of the meltblown was 1 to 5 μm. The fiber size of the ePTFE membrane was 0.1 to 0.3 μm and its basis weight was 5.0 g/m2. The fiber size of the spunbond polyester was 30 to 50 μm.

The resulting filter media had a basis weight of 200 g/m2. The filter media had an air permeability of 10.7 Frazier and a water entry pressure of 3 PSI. The filtration efficiency of the filter media was 99.785% at 0.1 μm DOP (Dioctyl Phthalate) @ 2.5 cm/s flow. The specific quality was 1.2 1/krayls. The dust loading capacity was 16.8 g/m2.

The filter media was bonded using a patterned anvil roll that produced a plurality of point bonds across the filter media in a diamond pattern. The individual rolls of material were unwound from individual stands and the webs were brought together to form a multilayer web prior to bonding. The composite web passed through a processing point that comprised on the top side an ultrasonic horn providing ultrasonic energy in the form of high frequency movement (20000 Hz) and pressure against the material and a rotating cylindrical anvil positioned below the web with a pattern of points protruding up from the anvil surface.

The round individual point bonds had a diameter of 1.6 mm and a density of approximately 524 point bonds per square foot. The total area of the point bonds was less than two percent of the total surface area of the bonded filter media. Due to the raised bond points on the anvil, the material was exposed to compression at the bond points and much less pressure between the points. The bonding of the three layers was completed in one pass through the machine.

Additional modifications and extensions to the embodiments described herein will be apparent to those skilled in the art. Such modifications and extensions are intended to be within the scope of the present invention as defined by the claims that follow.

What is claimed is:

1. Filter media comprising:
a first material comprising a first thermoplastic;
a second filter material comprising a PTFE membrane having porosity; and
a third material comprising a second thermoplastic;
wherein in a first region of said filter media, at least portions of said first material are separately disposed in a first layer, at least portions of said second filter material are separately disposed in a second layer, and at least portions of said third material are separately disposed in a third layer;
wherein said second layer is disposed between said first and third layers in said first region of said filter media;
wherein in at least one second region of said filter media different from the first region, one of a portion of said first material or a portion of said third material fills at least a portion of the porosity of said second filter material to provide a bond for restricting relative movement between at least the first layer and the second layer or between at least the third layer and the second layer in the first region.

2. The filter media of claim 1, wherein said second layer has an air permeability of at least 4 Frazier.

3. The filter media of claim 2, wherein said second layer has a water entry pressure of greater than 0.5 PSI.

4. The filter media of claim 3, wherein said second filter material comprises ePTFE, wherein said second layer comprises a first ePTFE membrane.

5. The filter media of claim 4, wherein said first material is a filter material, wherein at least portions of said first material are disposed in a meltblown polymeric web, wherein said first material comprises a material selected from a group consisting of polypropylene, polyester, nylon, and polyethylene.

6. The filter media of claim 5, wherein said third material is a support material, wherein at least portions of said third material are disposed in fibers, wherein said fibers are selected from a group consisting of spunbond fibers, hydroentangled fibers, and wet laid fibers.

7. The filter media of claim 6, wherein said third material comprises a material selected from a group consisting of polyester, nylon, polypropylene, and polyethylene.

8. The filter media of claim 6, wherein said second layer comprises ePTFE membrane.

9. The filter media of claim 5, wherein said third material provides structural support for said filter media, wherein said third material comprises cellulose fibers and a thermoplastic binder, selected from a group consisting of phenolic, acrylic, and poly-vinyl acetate.

10. The filter media of claim 5, wherein at least portions of said third material are disposed in a permeable thermoplastic web, wherein said third material comprises a material selected from a group consisting of polypropylene, polyester, nylon, polyethylene and polyurethane.

11. The filter media of claim 4, wherein at least portions of said first material are disposed in a permeable thermoplastic web, wherein said first material comprises a material selected from a group consisting of polypropylene, polyester, nylon, polyethylene and polyurethane.

12. The filter media of claim 11, wherein said third material is a support material, wherein at least portions of said third material are disposed in fibers, wherein said fibers are selected from a group consisting of spunbond fibers, hydroentangled fibers, and wet laid fibers.

13. The filter media of claim 12, wherein said third material comprises a material selected from a group consisting of polyester, nylon, polypropylene, and polyethylene.

14. The filter media of claim 11, wherein said third material provides structural support for said filter media, wherein said third material comprises cellulose fibers and a thermoplastic binder, selected from a group consisting of phenolic, acrylic, and poly-vinyl acetate.

15. The filter media of claim 3, wherein said second layer has a water entry pressure of greater than 1.5 PSI.

16. The filter media of claim 2, wherein said second layer has an air permeability of at least 10 Frazier.

17. The filter media of claim 1, wherein first, second and third layers are free from being bonded to each other in said first region of said filter media.

18. The filter media of claim 17, wherein said first material has a first melting point, wherein said second filter material has a second melting point, wherein said third material has a third melting point, and wherein said first and third melting points are lower than said second melting point.

19. The filter media of claim 18, wherein a ratio of the area of said first region to the total area of area all of said second regions is at least 9 to 1.

20. The filter media of claim 19, wherein a ratio of the area of said first region to the total area of area all of said second regions is at least 32 to 1.

21. The filter media of claim 1, wherein said second region of said filter media has a minimum thickness that is less than 50 percent of a maximum thickness of said filter media in said first region.

22. The filter media of claim 1, wherein said bond in said second region of said filter media restricts any of the layers of the filter media from being removed from the other layers without damaging any of the layers of the said media.

23. The filter media of claim 1, wherein said filter media has a specific quality of at least about 0.8 1/krayls at 0.1 µm DOP particle at 2.5 cm/s air velocity.

24. The filter media of claim 1, wherein said filter media has a dust loading capacity greater than about 10 g/m2.

25. The filter media of claim 1, wherein said filter media is folded to form pleats.

26. The filter media of claim 25, wherein a maximum cross dimension of one of said at least one second regions is less than twice a minimum thickness of said filter media in said first region.

27. The filter media of claim 1, further comprising a fourth layer comprising a meltblown fibrous web, wherein said third layer is disposed between said second and fourth layers.

28. The filter media of claim 27, further comprising a fifth layer comprising a spun bond thermoplastic fibrous web, wherein said fourth layer is disposed between said third and fifth layers.

29. The filter media of claim 1, further comprising a plurality of said second regions.

30. The filter media of claim 29, wherein each of said plurality of said second regions defines a point bond.

31. The filter media of claim 30, wherein said point bonds are ultrasonic bonds.

32. The filter media of claim 29, wherein said second layer has an air permeability of at least 4 Frazier.

33. The filter media of claim 32, wherein said second layer has a water entry pressure of greater than 0.5 PSI.

34. The filter media of claim 33, wherein said second material comprises ePTFE, wherein said second layer comprises a first ePTFE membrane.

35. The filter media of claim 33, wherein said second layer has a water entry pressure of greater than 1.5 PSI.

36. The filter media of claim 32, wherein said second layer has an air permeability of at least 10 Frazier.

37. The filter media of claim 29, wherein a ratio of the area of said first region to the total area of area all of said second regions is at least 9 to 1.

38. The filter media of claim 37, wherein a ratio of the area of said first region to the total area of area all of said second regions is at least 32 to1.

39. The filter media of claim 1 made by the process comprising:
  a. providing a first material comprising a first thermoplastic;
  b. providing a second filter material comprising a PTFE membrane having porosity;
  c. providing a third material comprising a second thermoplastic
  d. applying energy to a region of said filter media to heat the first, second and third layers to a temperature that is above the melting points of said first and below the melting point of the second layer, and wherein one or both of the first material and the third material flows into the open pores of the second material and the first and third material are bonded to provide a bond for restricting relative movement between at least the first layer and the second layer or between at least the third layer and the second layer in the first region.

40. The filter media of claim 1, wherein in at least one second region of said filter media at least portions of said first material and said second filter material, and at least portions of said first material said third material, are directly bonded to define a continuous bond therebetween, wherein said continuous bond restricts relative movement of said first layer, said second layer and said third layer in said first region.

41. The filter media of claim 40, wherein in each of a plurality of second regions of said filter media at least portions of said first material and said second filter material, and at least portions of said first material and said third material, are directly bonded to define a continuous bond therebetween, wherein said continuous bond of each of said plurality of second regions restricts relative movement of said first layer, said second layer and said third layer in said first region.

42. The filter media of claim 41, wherein said plurality of second regions are arranged in a pattern with said first region located thereabout.

43. The filter media of claim 41, wherein in said first region said first layer, said second layer and said third layer are free from being bonded to each other.

44. The filter media of claim 41, wherein a ratio of the area of said first region to the total area of area all of said plurality of second regions is at least 9 to 1.

45. The filter media of claim 41, wherein each of said plurality of second regions of said filter media has a minimum thickness that is less than 50 percent of a maximum thickness of said filter media in said first region.

46. The filter media of claim 1, wherein at least a portion of said first material fills at least a portion of the porosity of said second filter material to provide a bonding for restricting relative movement between at least the first layer and the second layer in the first region, and wherein a portion of said third material fills at least a portion of the porosity of said second filter material to provide bond for restricting relative movement between at least the third layer and the second layer in the first region.

* * * * *

UNITED STATES PATENT AND TRADEMARK OFFICE
CERTIFICATE OF CORRECTION

| | |
|---|---|
| PATENT NO. | : 8,147,583 B2 |
| APPLICATION NO. | : 11/760433 |
| DATED | : April 3, 2012 |
| INVENTOR(S) | : Richard Gebert et al. |

Page 1 of 1

It is certified that error appears in the above-identified patent and that said Letters Patent is hereby corrected as shown below:

At column 11, line 66, delete "10".

At column 13, line 8, delete "20".

Signed and Sealed this
Fifth Day of June, 2012

David J. Kappos
*Director of the United States Patent and Trademark Office*